United States Patent [19]

Milliren

[11] 4,185,807

[45] Jan. 29, 1980

[54] PLASTIC VALVE

[75] Inventor: Guy L. Milliren, Saint Louis Park, Minn.

[73] Assignee: Fluoroware, Inc., Chaska, Minn.

[21] Appl. No.: 890,611

[22] Filed: Mar. 20, 1978

[51] Int. Cl.² ............................................. F16K 31/44
[52] U.S. Cl. ................................... 251/218; 277/110
[58] Field of Search ............................. 251/214–225; 285/343; 277/110, 112; 403/370; 137/331, 333

[56] References Cited

U.S. PATENT DOCUMENTS

| 869,878 | 11/1907 | Bruckner | 251/218 |
|---|---|---|---|
| 1,182,359 | 5/1916 | Dies | 277/110 |
| 2,192,565 | 3/1940 | Szekely | 277/110 |
| 2,721,749 | 10/1955 | Crow | 277/110 |
| 3,048,362 | 8/1962 | Scarborough | 251/224 |
| 3,365,216 | 1/1968 | Babylon | 285/343 |

FOREIGN PATENT DOCUMENTS

| 36719 | 11/1965 | German Democratic Rep. | 285/343 |
|---|---|---|---|
| 1512191 | 12/1967 | France | 285/343 |
| 1016347 | 1/1966 | United Kingdom | 285/343 |

*Primary Examiner*—Martin P. Schwadron
*Assistant Examiner*—A. Michael Chambers
*Attorney, Agent, or Firm*—H. Dale Palmatier

[57] ABSTRACT

An all-plastic valve including a molded plastic housing, a molded plastic retaining nut, and a molded plastic valve stem.

8 Claims, 4 Drawing Figures

PLASTIC VALVE

This invention relates to an all-plastic liquid shut-off valve.

BACKGROUND OF THE INVENTION

It has become quite commonplace to use pipes and conduits made of plastics for carrying highly corrosive liquids which may be extremely caustic or acid in nature. The plastics employed have varied considerably in nature but are oftentimes of a fluorocarbon resin plastic which is highly resistive to corrosive liquids. Fittings for such pipes and conduits have been made of plastic and have been improved so that extremely tight seals are obtained between the fittings and the lengths of tubing or conduit. Typical of such fittings are those illustrated in U.S. Pat. No. 3,977,708.

Suitable valves for use in conveying systems for highly corrosive liquids have not been commonplace. Considerable difficulty has been experienced in the use of ordinary valves because of the extremely sensitive nature of such valves to highly corrosive liquids.

SUMMARY OF THE INVENTION

This invention provides a valve having a minimal number of parts, but all of the parts of which are formed of plastic in such a manner that the parts can be molded and then subsequently assembled.

The valve includes a valve housing with conduit portions for connection by fittings to the pipe or duct. The housing forms a valve seat over which the liquid flow is required to pass. An internally threaded boss on the side of the housing guides a threaded valve stem toward the valve seat and the valve stem has an annular tapered valve element which is movable into circumferential engagement with the valve seat for producing complete sealing and closing of the liquid flow passageway through the housing.

The stem is retained in the threaded boss of the housing by a retaining nut which is threaded onto the exterior of the mounting boss on the housing. The nut embraces the valve stem and has a wedging collar which wedges against the valve stem as the nut is tightened onto the housing. The wedging collar seals extremely tightly against the periphery of the valve stem and also prevents withdrawal of the valve stem from the nut and housing by engaging an enlarged band or annular rib on the periphery of the stem.

The stem may be initially assembled with the nut by slipping the enlarged band or rib through the open end of the nut and causing the tapered collar in the nut to expand resiliently and allow the band of the valve stem to pass by, after which the stem cannot be withdrawn from the nut. After the nut is tightened onto the housing and is cammed peripherally inwardly against the stem, the nut provides a positive stop against withdrawal of the valve stem from the housing.

DETAILED SPECIFICATION

Figure 1:
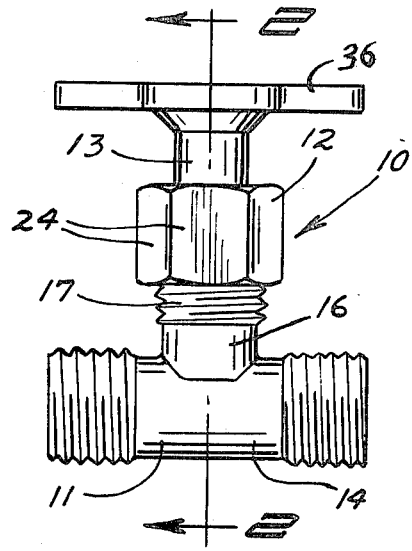
FIG. 1 is an elevation view of the assembled valve.

One form of the invention is shown in the drawings and is described herein. The valve is indicated in general by numeral 10 and has a valve housing 11, a retaining nut 12, and a valve stem 13. The valve has no other parts, and all of the parts, including the housing 11, nut 12, and valve stem 13 are individually integrally molded in one piece of suitable plastic such as a fluorocarbon resin plastic. The plastic is stiff and rugged, but has at least minimal resiliency to permit slight expansion and compression, as described.

The housing 11 has a duct 14, the ends 14.1 of which are suitably adapted for connection to fittings by which the valve housing may be connected to the end of a conduit or pipe. In the form illustrated, the ends of the duct 14 are threaded identically, but in other instances different threads may be provided on opposite ends of the duct 14 and in some instances other types of connecting arrangements may be supplied.

The duct 14 defines a flow-through passage 15 for the liquids.

The housing also has a transverse sleeve 16 for mounting the valve stem 13. Sleeve 16 has exterior threads 17 and also interior threads 18. Adjacent the outer ends of the inner threads 18, sleeve 16 has an annular recess 19 bounded by an elongate cylindrical surface 20 with a diameter slightly larger than the diameter of threads 18.

Sleeve 16 is also provided with a substantially conical or flared inner peripheral surface 21 immediately adjacent the outer end of the sleeve. The flared surface 21 immediately adjoins the cylindrical surface 20.

The nut 12 has an outer peripheral wall 22 with internal threads 23 to fit closely with the external threads 17 of sleeve 16. Peripheral wall 22 also has a number of flat faces 24 at its exterior periphery to provide a grip for engagement by a wrench in order to tighten the nut 12 onto sleeve 16.

The nut 12 normally extends well beyond the outer end of sleeve 16. An annular ferrule 25 protrudes from the outer end 26 of the nut at which location the ferrule is connected to and formed integrally with the peripheral sidewall 22 of the nut. The ferrule 25 defines the inner peripheral surface 27 of the nut, and has a smoothly tapered outer surface 28 which is spaced from the internal threads 23 of the nut. The tapered outer surface 28 of the ferrule 25 very tightly engages the flared surface 21 of sleeve 16 and is directed thereby into tightly gripping relation onto the valve system 13.

Figure 4:
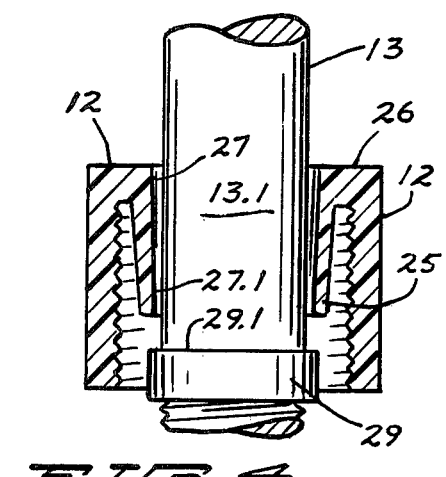
FIG. 4 is an enlarged detail section view showing the preassembly of the nut with the valve stem prior to assembling the valve stem and nut with the housing.

When the ferrule 25 is in relaxed condition as illustrated in FIG. 4, the ferrule remains in spaced relation with respect to the valve stem 13 throughout substantially the entire length of the ferrule. At the outer end 26 of the nut, the inner peripheral surface 27 of the nut has a diameter substantially in excess of the diameter of smooth cylindrical surface 13.1 of the valve stem so that when the stem and nut are separated from the housing as illustrated in FIG. 4, the nut 12 is quite loose on the valve stem.

The ferrule 25 is slightly tapered so that the inner periphery of the nut, at 27.1, normally embraces the cylindrical surface 13.1 of the valve stem more closely than the surface 27 does adjacent the outer end 26 of the nut. It will be evident that the inner periphery 27 of the nut is substantially the same diameter as the exterior diameter of the enlarged belt or collar 29 of the valve stem. This relationship permits the nut 12 to be initially assembled with the valve stem, prior to assembly with the housing 11, by slipping the nut 12 over the threaded end of the valve stem and then sliding the enlarged belt of the valve stem downwardly through the inner periphery 27 of the nut. During this assembly of the valve stem and nut, the ferrule 25 must necessarily resiliently distend or enlarge as the belt 29 of the valve stem passes downwardly through the ferrule. Thereafter, the belt 29 on the valve stem will abut against the end of the ferrule 25 and be prevented from passing through the ferrule again. When the nut 12 is applied to the sleeve 16 of the housing, the ferrule is constricted inwardly by the flared surface 21 of sleeve 16 so that the ferrule very tightly embraces the valve stem and prevents any possible disassembly of the valve stem from the housing.

It will be recognized that the enlarged belt 29 is received in the recess 19 to slide along the cylindrical surface 20 of the sleeve 16. The valve stem 13 is threaded at 30 so as to engage and fit with the internal threads 18 of the sleeve, and thereby accommodate inward and outward movement of the valve stem.

The valve stem also has a tapered and conical valve element 31 formed integrally therewith to move toward and away from the annular valve seat 32 of the housing. The valve seat 32 is formed on an annular wall 33 which traverses the interior of duct 14. The annular wall 33 has an inlet port 34 and an outlet port 35 through which flow of liquid is permitted. When the valve element 31 moves downwardly from the position of FIG. 3 into engagement with the annular valve seat 32 in the manner illustrated in FIG. 2, flow through the duct 14 is stopped.

The valve stem also has a manipulating handle 36 by which the stem may be rotated.

During the normal use of the valve, after it is connected into a flow line, the nut 12 is turned tightly downwardly onto the sleeve 16 so that the lower end of the ferrule 25 is constricted inwardly and very tightly against the cylindrical surface of valve stem 13. The end of ferrule 25 is thereby in confronting relation with the annular ledge 29.1 defined by the enlarged belt 29.

Figure 2:
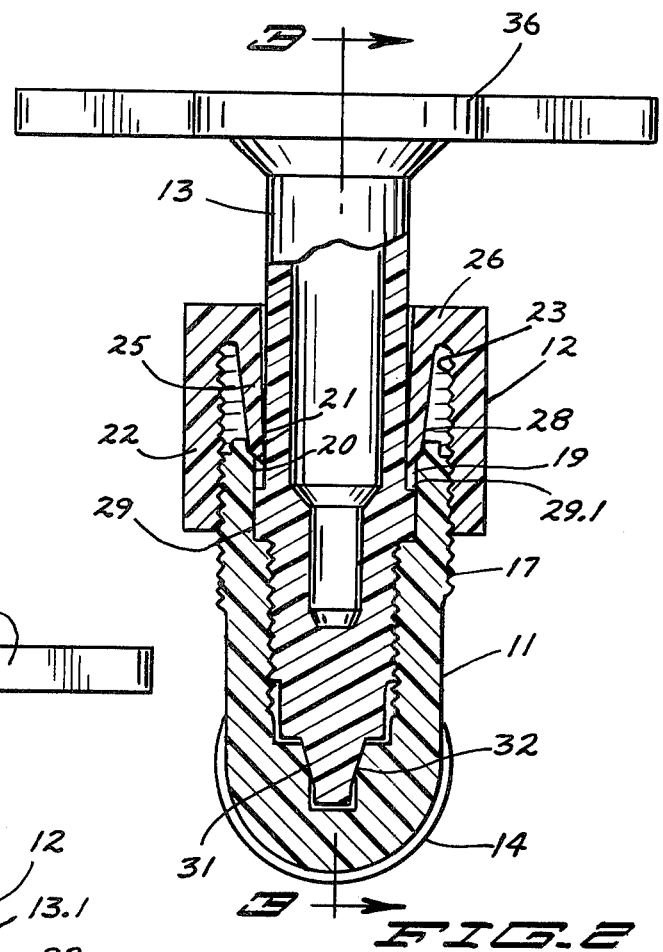
FIG. 2 is an enlarged detail section of the valve as viewed at 2—2 in FIG. 1.
Figure 3:
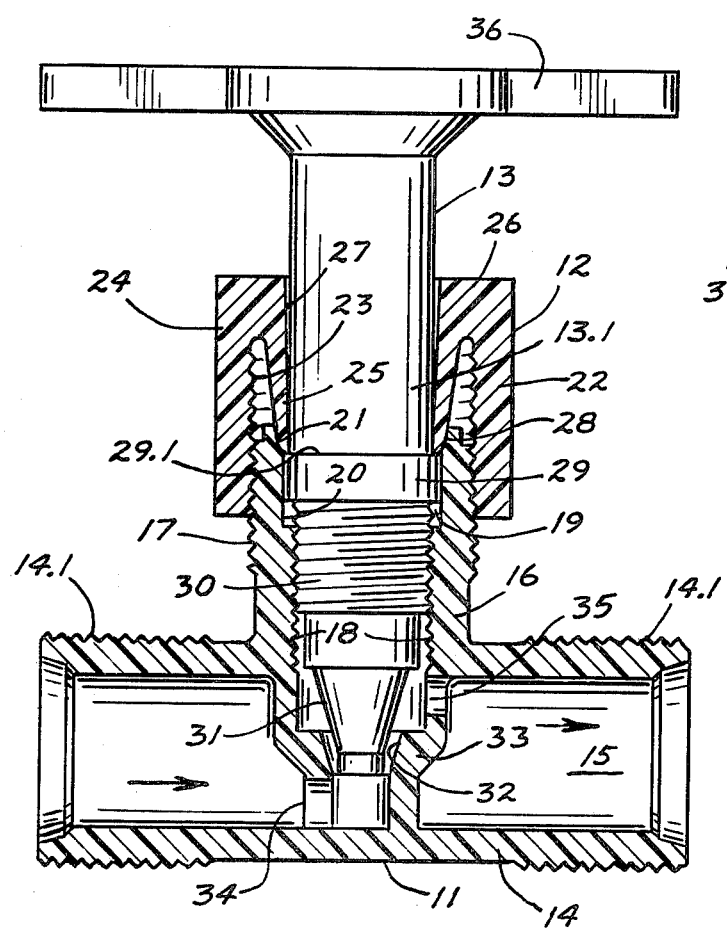
FIG. 3 is an enlarged detail section view of the valve taken approximately at 3—3 in FIG. 2, but showing the valve stem and valve element in shifted position relative to that illustrated in FIG. 2.

When the valve stem 13 is turned inwardly so that the valve element 31 seals tightly against the valve seat 32, the ledge 29.1 of the band 29 will be spaced downwardly from the end of ferrule 25, substantially as illustrated in FIG. 2.

As the valve stem is rotated so as to withdraw the valve element 31 from the seat 32, the nut 12 will remain stationary on the sleeve 16 and the stem 13 will move spirally along the inner periphery of the nut, and simultaneously, the enlarged belt 29 moves in the recess 19 so that the ledge 29.1 will gradually approach the end face of the ferrule 25. As the valve element 31 is retracted to the fullest extent from the valve seat 32, so as to open the valve to a maximum extent, the ledge 29.1 defined by the enlarged belt or collar 29 will bear against the end of ferrule 25 and be prevented from moving any further. Accordingly, disassembly of the valve will not inadvertently occur during the normal operation of this valve.

It will be seen that I have provided a new and improved all-molded plastic valve with but three parts, a housing, a nut, and a valve stem, each of which is integrally molded in one piece. The valve stem is retained in the sleeve of the housing by the nut and is very tightly gripped by the ferrule so as to prevent any possible leaking through the threads and along the periphery of the valve stem. The turning of the valve stem is limited by the enlarged belt on the stem coming into engagement with the end of the ferrule when the valve is full open. The enlarged belt tightly engages an inner cylindrical surface of the housing sleeve in a sealing relationship as to make the leakage of the valve less likely. Sealing between the end of the tapered surface 28 of the ferrule against the flared surface 21 of the sleeve also contributes significantly to the sealing of the valve and the prevention of leakage.

Of course, when the valve is full open, with the enlarged belt 29 bearing against the end of the ferrule 25, leakage is also inhibited by the relationship between the belt 29 and the ferrule.

Initial assembly of the three parts is readily and easily accomplished. The internal periphery of the nut will receive the valve stem and the enlarged belt of the valve stem which may be forced through the ferrule but thereafter may not be removed.

What is claimed is:

1. A shut-off valve for flowing liquids comprising
a valve housing having a flow-through passage means and having an internally threaded valve stem mounting sleeve protruding transversely of such passage means, the housing also having a valve seat in the passage means and opposite the sleeve, and the exterior of the sleeve also being threaded adjacent the outer end of the sleeve, the sleeve also having an outwardly flaring conical inner peripheral surface adjacent the outer end of the sleeve.
a molded plastic retaining nut with an internally threaded peripheral wall embracing the threaded exterior of the sleeve and extending beyond the outer end of the sleeve, the nut also having an annular ferrule spaced inwardly of the peripheral wall and extending into the open outer end of the mounting sleeve of the housing, the ferrule having a smooth and tapered outer face engaging the conical surface at the outer end of the mounting sleeve and the ferrule being contricted by said sleeve and
a molded plastic valve stem with handle means integrally molded on the outer end thereof, the stem extending through the inner periphery of the ferrule and through the sleeve and having an inner end with a valve element within the housing and sealing against said valve seat, the stem being rotatable in the ferrule and being threaded into the internal threads of the sleeve to move the valve element relative to the seat, and the valve stem having an annular shoulder facing the end of the ferrule to engage the ferrule and be retained thereby against removal from the housing.

2. The shut-off valve according to claim 1, and the nut having an outer end adjacent the valve stem, the ferrule and peripheral wall of the nut being joined together adjacent said outer end of the nut, the inner periphery of the ferrule adjacent the outer end of the nut having a size as to receive said annular shoulder of the valve stem therethrough during assembly of the nut with the valve stem.

3. The shut-off valve according to claim 1 and said valve stem having a smooth cylindrical surface adjacent said annular shoulder and being embraced by the inner periphery of the ferrule, the valve stem being threaded between said valve element and the annular ledge.

4. The shut-off valve according to claim 3 and the valve stem having an annular collar adjacent said cylindrical surface and defining said annular shoulder, the collar being disposed between the smooth cylindrical surface and the threads of the valve stem.

5. The shut-off valve according to claim 1 and the annular ferrule having an outer peripheral surface with a wedging taper engaging the interior of the stem mounting sleeve adjacent the outer end of the sleeve and being constricted thereby into tightly sealing relation with the valve stem.

6. A shut-off valve according to claim 1 and the valve stem having an enlarged annular belt defining said annular shoulder, the valve stem having threads threaded into the housing sleeve at a location between said belt and the valve element, the belt having a larger diameter than the threads on the valve stem, the sleeve of the housing having a smooth annular inner peripheral surface embracing said belt and having a length along the sleeve substantially longer than the width of the belt to permit inward and outward movement of the valve stem.

7. A shut-off valve for flowing liquids, comprising
  a molded plastic valve housing having a flow-through duct and having an internally threaded valve stem mounting sleeve protruding transversely of the duct and also having a valve seat in the duct opposite the sleeve, the exterior of the sleeve also being threaded, the sleeve also having an outwardly flaring conical inner peripheral surface adjacent the outer end of the sleeve,
  a molded plastic retaining nut with an internally threaded peripheral wall embracing the exterior of the sleeve and threaded thereon, the peripheral wall of the nut extending beyond the outer end of the sleeve and the nut having an annular ferrule spaced inwardly of the peripheral wall and extending endwise inwardly into the open outer end of the mounting sleeve of the housing, the ferrule having a smooth and tapered outer face engaging the conical surface at the outer end of the mounting sleeve and the ferrule being constricted by said sleeve, and
  a molded plastic valve stem extending through the inner periphery of the ferrule and through the sleeve and having an inner end with a valve element within the housing and sealing against the valve seat, the valve stem being threaded into the internal threads of the sleeve and being rotatable for moving said valve element toward and away from the valve seat and the valve stem having an annular shoulder facing the end of the ferrule to engage the ferrule and be retained thereby, against removal from the housing.

8. An all-molded plastic shut-off valve for flowing liquids, comprising
  a valve housing having a flow-through duct and having an internally threaded valve stem mounting sleeve protruding transversely of the duct, the housing also having an annular valve seat in the duct and confronting the sleeve in concentric relation therewith, the sleeve also having exterior threads and an outwardly flaring conical inner peripheral surface adjacent the outer end of the sleeve, the sleeve also having an elongate inner cylindrical surface between said conical surface and the internal threads of the sleeve and said cylindrical surface having a diameter larger than the diameter of the internal threads of the sleeve,
  a molded plastic retaining nut with an internally threaded peripheral wall embracing the threaded exterior of the sleeve and extending beyond the end of the sleeve, the nut having an outer end and also having an annular ferrule spaced inwardly of the peripheral wall and extending from the outer end of the nut and into the open outer end of the mounting sleeve, the ferrule having a smooth and tapered outer face engaging the conical surface at the outer end of the mounting sleeve and the ferrule being constricted by said sleeve, and
  a molded plastic valve stem with an integrally molded handle means on the outer end thereof and the stem extending through the inner periphery of the nut and ferrule and through the sleeve and having an inner end with an annular valve element within the housing and sealing against the valve seat, the stem being threaded into the internal threads of the sleeve for moving the valve element into and out of seating engagement with the valve seat, the valve stem also having an enlarged belt bearing outwardly against the inner peripheral cylindrical surface of the sleeve and having a width significantly less than the length of said cylindrical surface to permit movement of the belt along said surface during opening and closing of the valve, said enlarged belt defining an annular shoulder facing the inner end of the ferrule and engaging the ferrule to be retained thereby against removal from the housing, the valve stem also having a smooth cylindrical surface opposite the inner periphery of the ferrule and being tightly embraced by the ferrule but rotatable with respect to the ferrule, the enlarged belt on the valve stem having an exterior diameter to be received within the inner periphery of the nut adjacent the outer end thereof to permit the belt to slide through the ferrule during the initial assembly of the plastic valve.

* * * * *